No. 853,576. PATENTED MAY 14, 1907.
T. R. BROWN.
TANK CAR.
APPLICATION FILED NOV. 15, 1906.
3 SHEETS—SHEET 2.
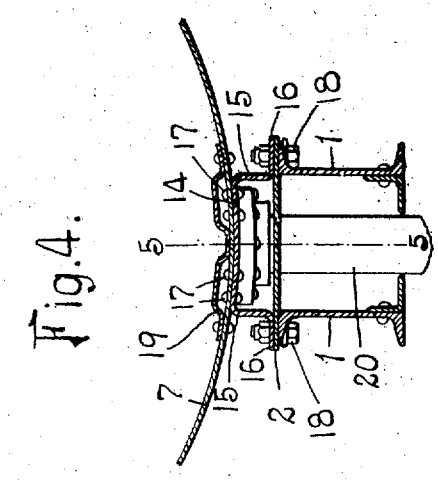
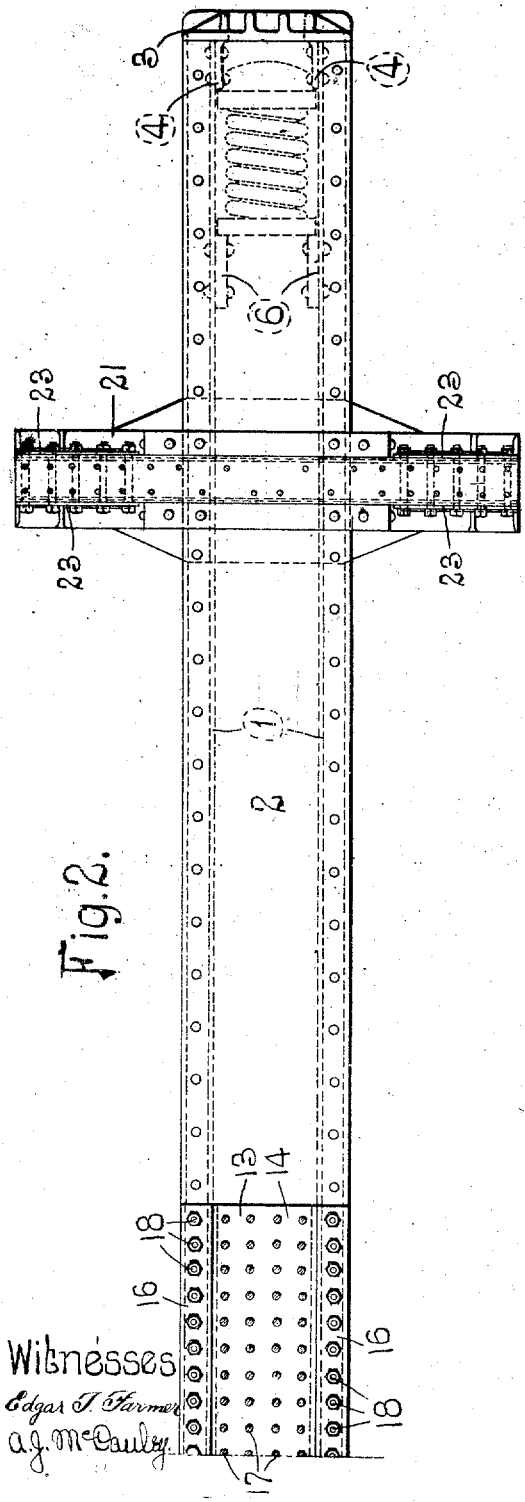
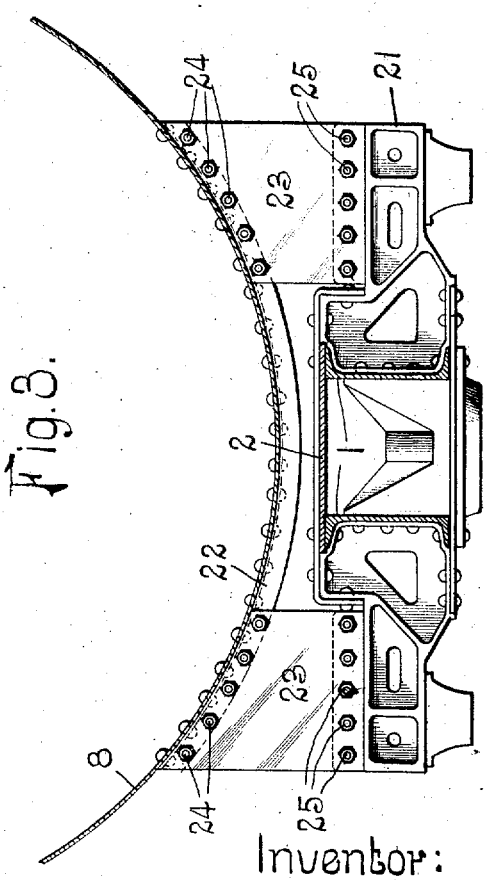
Witnesses
Edgar T. Farmer
A. J. McCauley
Inventor:
Thomas R. Brown
by Bakewell Cornwall
Atty's.

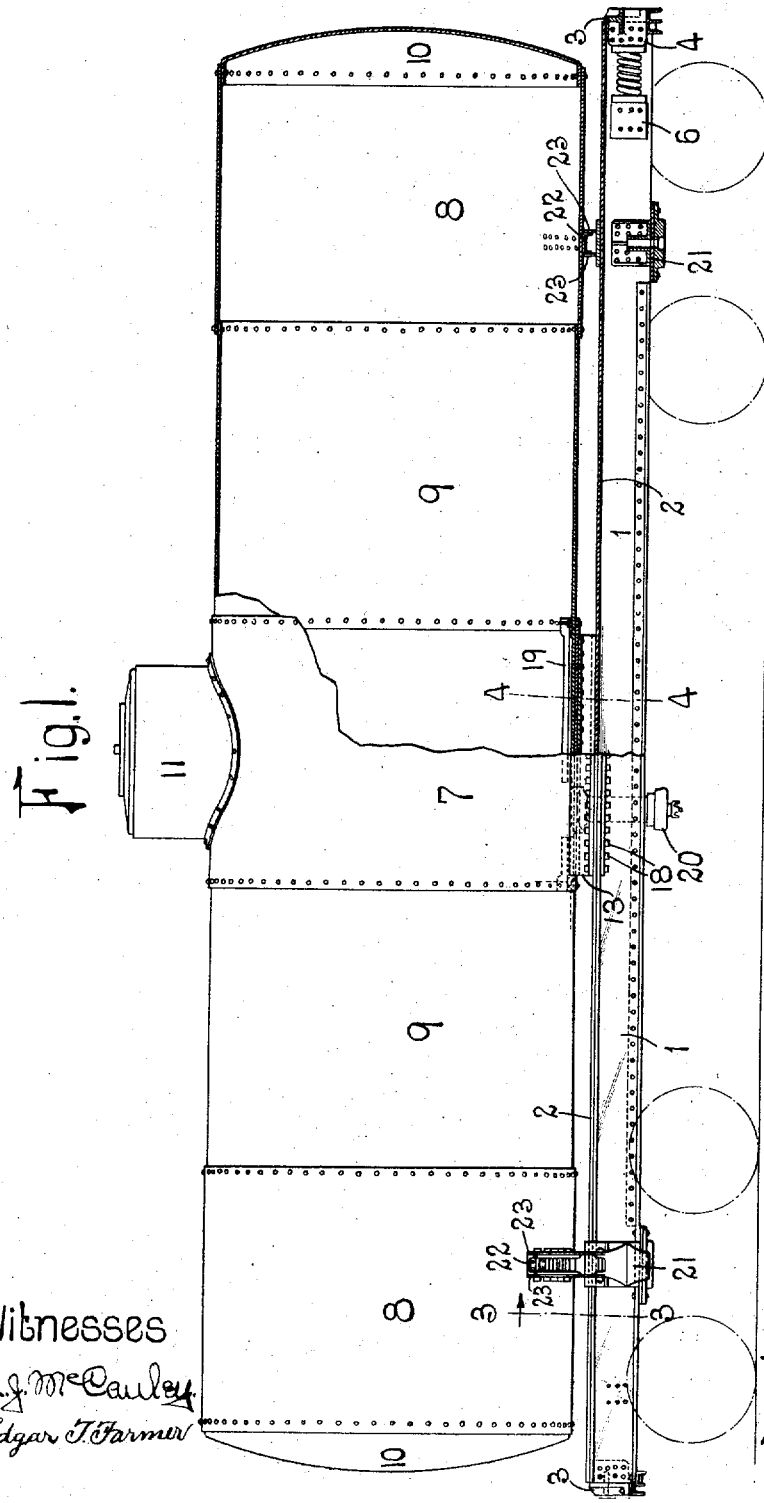

No. 853,576. PATENTED MAY 14, 1907.
T. R. BROWN.
TANK CAR.
APPLICATION FILED NOV. 15, 1906.
3 SHEETS—SHEET 3.
Fig.5.
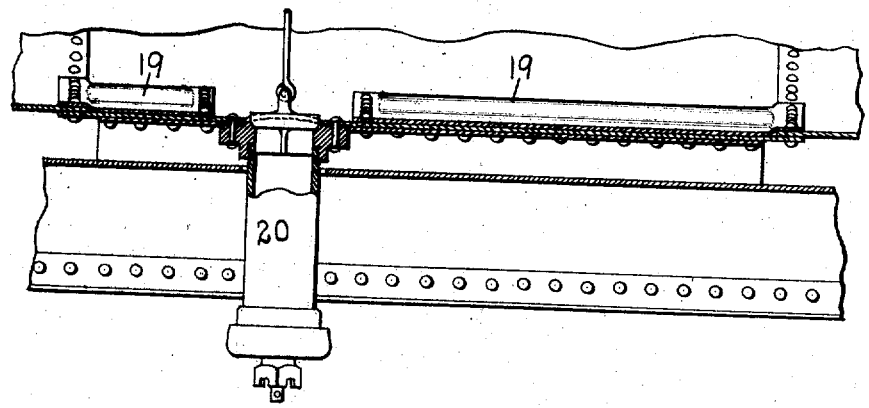
Fig.6.
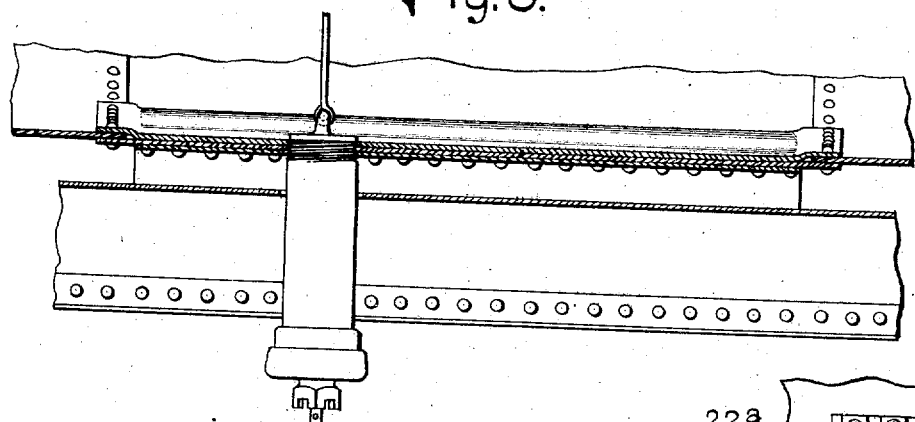
Fig.7.
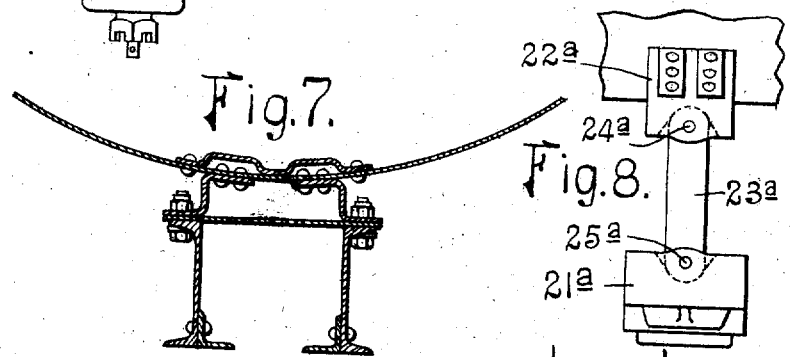
Fig.8.
Witnesses
Edgar T. Farmer
A. J. McCauley
Inventor:
Thomas R. Brown
by Bakewell Cornwall
Att'y's.

UNITED STATES PATENT OFFICE.

THOMAS R. BROWN, OF NEW YORK, N. Y., ASSIGNOR TO AMERICAN CAR & FOUNDRY COMPANY, OF ST. LOUIS, MISSOURI, A CORPORATION OF NEW JERSEY.

TANK-CAR.

No. 853,576.  Specification of Letters Patent.  Patented May 14, 1907.

Application filed November 15, 1906. Serial No. 343,576.

*To all whom it may concern:*

Be it known that I, THOMAS R. BROWN, a citizen of the United States, residing in the city, county, and State of New York, have invented a certain new and useful Improvement in Tank-Cars, of which the following is a full, clear, and exact description, such as will enable others skilled in the art to which it appertains to make and use the same, reference being had to the accompanying drawings, forming part of this specification, in which—

Figure 1 is a side elevational view of a tank car constructed in accordance with my invention; Fig. 2 is a plan view illustrating one-half of the underframing; Fig. 3 is a sectional view taken on the line 3—3 of Fig. 1; Fig. 4 is a sectional view taken on the line 4—4 of Fig. 1; Fig. 5 is a sectional view on the line 5—5 of Fig. 4; Fig. 6 is a view similar to Fig. 5 illustrating a modified form; Fig. 7 is a view similar to Fig. 4 illustrating a modified form of tank-support; and Fig. 8 illustrates a modified form of connection between the tank and body bolster.

This invention relates to a new and useful improvement in tank cars, one of the objects being to provide a car in which the tank is free to expand or contract longitudinally. In a construction of this character the rivets that secure the different sections of the tank together will not be exposed to a shearing strain when the tank and underframe tend to independently expand or contract.

Another object is to provide a tank that can be supported by a light and simple underframe.

Another object is to provide means whereby the tank may be easily removed from the underframe.

With these objects in view, the invention consists in the construction, arrangement and combination of the several parts, all as will be hereinafter described and afterward pointed out in the claims.

Referring to the accompanying drawings, 1 indicates the longitudinal sills, herein shown as channels reinforced by angles at their lower edges and provided with a cover plate 2. These sills preferably extend from end to end of the car and serve as draft members.

Buffer blocks 3 cover the ends of the longitudinal sills, said blocks being provided with a pair of inwardly projecting flanges 4 which are riveted to the sills and whose inner ends serve as draft lugs. A draft rigging is interposed between the lugs 4 and another pair of lugs 6. I have herein shown the ordinary spring draft rigging which consists of a spring arranged between two follower plates, the followers abutting the lugs 4 and 6. However, the use of my invention is not limited to any particular kind of draft gear.

The tank consists of a middle cylindrical section 7, end sections 8, intermediate sections 9, heads 10 and the usual filling dome 11. The ends of the intermediate sections have telescopic engagement with the middle and end sections, that is, they are arranged inside of and riveted to said sections. I prefer to construct the tank in this manner because it will only be necessary to provide extraneous supports for the middle and end sections, they in turn supporting the intermediate sections.

13 indicates a pressed metal tank support arranged under the middle section 7. This support, as shown in Fig. 4, comprises a curved top portion 14, depending webs 15 and bottom flanges 16. The tank is secured to the top portion 14 by means of rivets 17. The flanges 16 rest on top of the longitudinal sills and are secured thereto by means of bolts 18. It will be noticed in this connection that while this tank support is rigidly secured to both the tank and longitudinal sills the weight of the tank does not place a shearing strain on the securing means.

If desired, the above-mentioned support may be composed of two Z-bars arranged as shown in Fig. 7.

To prevent leakage, should any of the rivets 17 work loose, pressed metal cover plates 19 are arranged inside of the tank above said rivets. The edges of these cover plates are riveted to the tank and calked. I prefer to use two of these cover plates and locate the usual discharge valve 20 between their adjacent edges, but if desired, one continuous cover plate provided with a threaded opening to receive a discharge valve may be employed, as shown in Fig. 6.

Body bolsters 21 are located under the end sections 8. These bolsters are secured to the center sills and may be of any suitable construction.

Flanged saddle members 22 herein shown as channels are secured to the under side of the end sections 8, above the body bolsters.

Vertically arranged connection plates 23 are secured at their upper ends to the members 22 by means of bolts 24. The lower edges of said plates rest on the body bolsters and are secured thereto by means of bolts 25. These plates are preferably arranged in pairs and located between the longitudinal sills and the ends of the body bolsters, as shown in the drawings. However, it will be understood that this construction could be varied in many ways; for example, the plates could extend from end to end of the bolsters, or, instead of being arranged in pairs a single plate could be employed. The plates are of sufficient strength to support the tank and are devoid of stiffening members, the object being to form a connection between the tank and underframe of sufficient flexibility to permit the tank to expand or contract longitudinally, independently of the underframe and without straining the rivets which secure the tank sections together. The connection thus made is practically a hinge. Instead of having a rigid connection at the center and flexible connections at the bolster points, the rigid connection could be at one bolster, and the other connection or connections flexible.

In the modified form shown in Fig. 8, the body bolster 21ª and the tank saddle 22ª are provided with suitable recesses to receive the approximately semi-circular ends of a rigid member 23ª. This rigid member is pivotally connected to the tank saddle and bolster by means of pins 24ª and 25ª, respectively, and performs the same function as the flexible plates 23.

In a car constructed in accordance with my invention, side and end sills are unnecessary.

The tank can be detached from the underframe by simply removing the bolts 21 and 24.

I am aware that minor changes in the construction, arrangement and combination of the several parts of my device can be made and substituted for those herein shown and described without departing from the nature and principle of my invention.

Having thus described the invention, what is claimed as new and desired to be secured by Letters Patent is:

1. In a tank car, the combination with a tank, of a frame, and flexible connections between said tank and frame which allow the tank to expand or contract longitudinally; substantially as described.

2. In a tank car, the combination with a tank, of bolsters, and connections between said tank and bolsters which allow the tank to expand or contract longitudinally; substantially as described.

3. In a tank car, the combination with a tank, of a frame, and connections between said tank and frame, only one of which connections is rigid and another of which is flexible; substantially as described.

4. In a tank car, the combination with a tank, of a frame, and connections between said tank and frame, one of which connections is flexible; substantially as described.

5. In a tank car, the combination with a tank, of a frame, and rigid and flexible connections between said tank and frame; substantially as described.

6. In a tank car, the combination with a tank, of a frame including bolsters, and flexible connections between said tank and frame at the bolster points; substantially as described.

7. In a tank car, the combination with a tank, of a frame including bolsters, rigid connections between the tank and frame between the bolsters, and flexible connections between said tank and frame at the bolster points; substantially as described.

8. In a tank car, the combination with a tank, of a bolster, a saddle secured to said tank, and tank-supporting members which allow the tank to expand or contract longitudinally, said members being interposed between said saddle and bolsters; substantially as described.

9. In a tank car, the combination with a frame including bolsters, of a tank rigidly secured to a part of said frame, saddles secured to said tank, and tank-supporting members which allow the tank to expand or contract longitudinally, said members being interposed between said saddles and bolsters; substantially as described.

10. In a tank car, the combination with a tank, of a frame, and a hinge connection between said tank and frame; substantially as described.

11. In a tank car, the combination with a tank, of a frame, and rigid and hinge connections between said tank and frame; substantially as described.

12. In a railway car, the combination with underframing, of a tank rigidly secured at the center to said underframing and held at the ends by flexible means which permit the tank to expand or contract longitudinally; substantially as described.

13. In a railway car, a tank, and bolsters hinged to said tank; substantially as described.

14. In a tank car, the combination with a tank, of a frame including bolsters hinged to the tank, and a rigid connection between said tank and frame between the bolsters; substantially as described.

15. In a railway car, the combination with a car body, of body bolsters, and flexible connections between said car body and body bolsters; substantially as described.

16. In a railway car, the combination with a car body, of body bolsters, and hinge connections between said car body and body bolsters; substantially as described.

17. In a railway car, the combination with a tank, of body bolsters, and depending plates connected to the tank, the lower edges of said plates resting on the body bolsters; substantially as described.

18. In a railway car, the combination with a tank, of body bolsters, and depending plates connected to the tank, the lower edges of said plates resting on and secured to the body bolsters; substantially as described.

19. In a railway car, the combination with a tank, of body bolsters, saddles secured to the tank, and connections between said saddles and body bolsters which allow the tank to expand or contract longitudinally; substantially as described.

20. In a railway car, the combination with a tank, of body bolsters, saddles secured to the tank, and hinge connections between said body bolsters and saddles; substantially as described.

21. In a railway car, the combination with a tank, of body bolsters, saddles secured to the tank, and flexible connections between said body bolsters and saddles; substantially as described.

22. In a railway car, the combination with a tank, of body bolsters, saddles secured to the tank, and connections interposed between said body bolsters and saddles which allow the tank to expand or contract longitudinally; substantially as described.

23. In a railway car, the combination with underframing, of a tank rigidly connected to said underframing at the center in such a manner that its weight does not place a shearing stress on the securing means, and held at the ends by flexible means which allow the tank to expand or contract longitudinally; substantially as described.

24. In a railway car, the combination with underframing, of a tank rigidly connected at one place to said underframing in such a manner that its weight does not place a shearing stress on the securing means, and held at other places by flexible means which allow the tank to expand or contract longitudinally; substantially as described.

25. In a tank car, the combination with a tank, of longitudinal sills, a tank-support rigidly secured to the tank and to said longitudinal sills, said tank-support being held against vertical displacement by said sills without placing a shearing stress on the securing means, and flexible tank-supports for permitting the tank to expand or contract longitudinally; substantially as described.

26. In a tank car, the combination with a tank, of longitudinal sills, a tank-support rigidly secured to the center of the tank and to said longitudinal sills, said tank-support being held against vertical displacement by said sills without placing a shearing stress on the securing means, and other tank-supports arranged adjacent the ends of the tank, for permitting the tank to expand or contract longitudinally; substantially as described.

27. In a tank car, the combination with a tank, of an underframe including a tank support extending longitudinally the tank, said tank support comprising a curved top portion, depending webs, and lower flanges; substantially as described.

28. In a tank car, the combination with a tank, of an underframe including a tank support extending longitudinally the tank, said pressed metal tank support comprising a curved top portion, depending webs, and lower flanges; substantially as described.

29. In a railway car, the combination with longitudinal sills, of a tank, and a tank-supporting member extending parallel to the longitudinal sills and having a curved top portion with depending webs and bottom flanges, said flanges being disposed outwardly and secured to the sills; substantially as described.

30. In a railway car, the combination with longitudinal sills, of a tank, and a tank-supporting member extending parallel to the longitudinal sills and having a curved top portion with depending webs and bottom flanges, said flanges resting on and secured to the longitudinal sills; substantially as described.

31. A telescopically constructed sectional tank, in combination with means for supporting the exteriorly arranged sections only; substantially as described.

32. A telescopically constructed sectional tank, the interiorly arranged sections of which have no extraneous supports; substantially as described.

33. In a railway car, the combination with longitudinal sills, of a tank comprising center, end and intermediate sections, and supports for said tank arranged under the last mentioned sections only; substantially as described.

34. In a railway car, the combination with longitudinal sills, of a tank comprising center, end and intermediate sections, and supports connected to the end and intermediate sections that will permit the tank to expand or contract; substantially as described.

35. In a railway car, the combination with a frame, of a tank riveted to a part of said frame, tight cover plates secured over the area of riveting, and connections between said tank and frame which allow the tank to expand or contract longitudinally; substantially as described.

36. In a railway car, the combination with a frame, of a tank riveted to a part of said frame, tight cover plates secured over the area of riveting, and flexible connections between said tank and frame which allow the tank to expand or contract longitudinally; substantially as described.

37. In a railway car, the combination with a frame, of a tank riveted to a part of said frame, tight cover plates secured over the area of riveting, and hinge connections between said tank and frame which allow the tank to expand or contract longitudinally; substantially as described.

In testimony whereof I hereunto affix my signature in the presence of two witnesses, this 2d day of November 1906.

THOMAS R. BROWN.

Witnesses:
 ROBT. G. JEFFERY,
 EDW. D. HILLMAN.